United States Patent [19]
Ghoshal

[11] Patent Number: 5,939,869
[45] Date of Patent: Aug. 17, 1999

[54] LOW POWER INTERCONNECTION USING MAGNETORESISTIVE ELEMENTS

[75] Inventor: Uttam Shamalindu Ghoshal, Austin, Tex.

[73] Assignee: International Business Machines Corporation, Armonk, N.Y.

[21] Appl. No.: 09/076,121

[22] Filed: May 12, 1998

[51] Int. Cl.[6] .................................................. G05F 1/40
[52] U.S. Cl. ............................................................ 323/282
[58] Field of Search .................................... 323/222, 282, 323/351; 395/500

[56] References Cited

U.S. PATENT DOCUMENTS 5,369,755  11/1994  Berkovich .................. 395/500
5,598,408  1/1997  Nickolls et al. .............. 370/351

*Primary Examiner*—Adolf Denske Berhane
*Attorney, Agent, or Firm*—Casimer K. Salys; Jack V. Musgrove; Andrew J. Dillon

[57] ABSTRACT

A low power communications bus uses a current source at one end of a transmission line, and a driver at the other end of the transmission line which generates a logic state based on the sensed current level. The invention is particularly suited for interconnecting a computer processor and its on-board caches. The driver at the load end of the transmission line includes an induction coil, and a magnetoresistive element located adjacent the coil. Separate ground planes can be provided for the coil and the magnetoresistive element, to avoid ground loops.

16 Claims, 3 Drawing Sheets

LOW POWER INTERCONNECTION USING MAGNETORESISTIVE ELEMENTS

BACKGROUND OF THE INVENTION

1. Field of the Invention

The present invention generally relates to a method for providing communications between various components in an electronic device, such as a computer system, by using a low power interconnection or bus, and more particularly to such a method and apparatus which utilize magnetoresistive elements to reduce power dissipation.

2. Description of Related Art

Modern electronic circuits use many different types of logic components (e.g., processing units) to carry out numerous functions. These circuits require a multitude of conductive pathways, or buses, to provide communications or connectivity between the logic components. A communications bus (transmission line) may be used to transmit certain values, such as data which are input to a logic component, or instructions used by the logic components, and further may be used to transmit various control signals. Buses can be unidirectional, bidirectional, or broadcast (used to interconnect three or more devices and allow simultaneous or sequential access to information or controls conveyed on the bus). These buses may be external, e.g., laid out on a printed circuit board, and interconnecting two or more devices which are separately packaged. They may also be internal, interconnecting two or more devices which are fabricated in a single package, such as an integrated circuit (IC).

Buses are used to interconnect devices for a wide variety of applications, including communications between complex computer components such as microprocessors, application specific integrated circuits (ASICs), peripheral devices, random-access memory, etc. Several different external bus designs have been developed for interconnecting various computer components. Early designs include the "expansion" bus referred to as the XT bus, and the later AT bus (also referred to as the Industry Standard Architecture (ISA) bus). A 32-bit extension to this bus was later created, which is referred to as the Extended Industry Standard Architecture (EISA). Another well-known external bus design is the Peripheral Component Interconnect (PCI) bus.

In addition to the foregoing external buses, many computer components use internal buses. For example, the PowerPC™ processor marketed by International Business Machines Corp. (IBM—assignee of the present invention) has a processing core which is connected to an instruction cache and a data cache. These caches temporarily store values that might be repeatedly accessed by the processor core, in order to speed up processing by avoiding the longer step of loading the values from the computer system's main memory. The instruction and data caches are "on-board," that is, fabricated on the same substrate (chip). An internal bus is provided which connects the instruction cache to a branch unit (the branch unit determines what sequence of instructions is appropriate, and forwards the ordered instructions to a dispatch unit in the processor core). A separate internal bus connects the data cache to one or more load/store units, which retrieve existing data, or store modified data, according to the associated instruction. In some high-end processors, these internal buses are now as large as 128 bits.

One problem that has arisen in the design of communications buses relates to power dissipation. Conventional buses use a hard-wired path to connect the various components, and the impression of voltages on the transmission lines results in power dissipation due to the characteristic impedance of the lines. Power loss is of particular concern with internal buses.

For example, in a high-speed bus (a clock speed of 100 MHz or more, and particularly above 1 GHz), the power dissipation $P_y$ that occurs during activation of a single line is approximately equal to $V^2/Z_0$, where $Z_0$ is the characteristic impedance of the line, and V is the voltage applied to the line to generate an active (high) signal. If such a bus has an impedance $Z_0$ of about 50 Ω (typical of prior art on-board buses), and it uses a common supply voltage ($V_{dd}$) of 1–2 volts to energize the bus, then the resulting power dissipation is at least 20 milliwatts per interconnect. Therefore, just one 128-bit bus can result in a power loss of 2.5 watts. The magnitude of this loss is very significant given the microscopic dimensions of the processor and the confined space in its packaging. The concomitant increase in temperature in the area surrounding the bus can be damaging to other elements of the circuit. Excess power consumption also becomes an issue with portable devices that use batteries.

Another problem with conventional buses is the creation of ground loops between the transmitting (source) end and the receiving (load) end of the bus. Ground loops can result in increased power loss, and ground "bounce" which introduce noise into the line.

In light of the foregoing, it would be desirable to devise a communications bus for a computer system which reduced power dissipation during activation of a transmission line. It would be further advantageous if the bus could avoid ground loops between the source and load ends of the bus.

SUMMARY OF THE INVENTION

It is therefore one object of the present invention to provide an improved communications bus for an electronic device.

It is another object of the present invention to provide such a communications bus which is adapted for use in a computer system.

It is yet another object of the present invention to provide a low power interconnection between logic components that are fabricated in a single package.

The foregoing objects are achieved in a communications bus for interconnecting two or more logic components in an electronic device, the communications bus generally comprising a transmission line having a source end and a load end, current means connected to the source end of the transmission line for providing at least two current levels associated with two respective logic states, and means for generating the respective logic states based on current levels sensed at the load end of the transmission line. The invention is particularly suited for interconnecting computer components, such as a processor and its on-board caches. In one embodiment, a low power interconnection is achieved by inducing a magnetic field at the load end of the transmission line, using a coil connected to the load end, and then sensing the magnetic field using a magnetoresistive element located adjacent the coil. Separate ground planes can be provided for the coil and the magnetoresistive element, to avoid ground loops.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

The present invention is directed to an improved method of providing communications between logic components in an electronic device, and is particularly useful in computer systems. While the invention is described below in conjunction with a specific computer embodiment, those skilled in the art will appreciate that it is equally applicable to other electronic devices which provide communications paths, or buses, to interconnect (externally or internally) two or more logic components.

Figure 1:
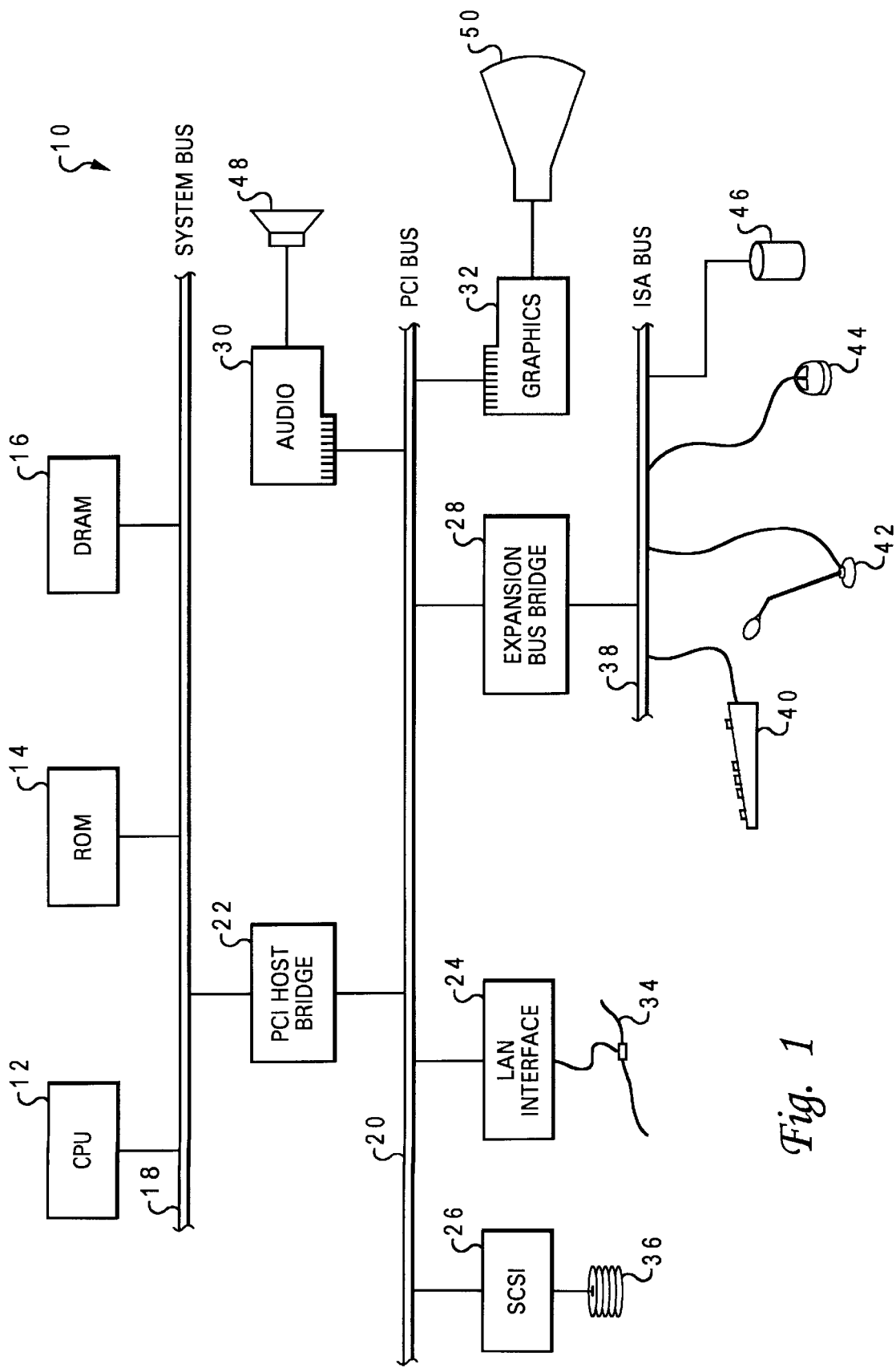
FIG. 1 is a block diagram of one embodiment of a computer system constructed in accordance with the present invention.

With reference now to the figures, and in particular with reference to FIG. 1, there is depicted one embodiment of a computer system 10 which utilizes the present invention. Computer system 10 includes a central processing unit (CPU) 12, firmware or read-only memory (ROM) 14, and a dynamic random access memory (DRAM) 16 which are all connected to a system bus 18. CPU 12, ROM 14 and DRAM 16 are also coupled to a PCI local bus 20 using a PCI host bridge 22. PCI host bridge 22 provides a low latency path through which processor 12 may access PCI devices mapped anywhere within bus memory or I/O address spaces. PCI host bridge 22 also provides a high bandwidth path allow the PCI devices to access DRAM 16.

Attached to PCI local bus 20 are a local area network (LAN) adapter 24, a small computer system interface (SCSI) adapter 26, an expansion bus bridge 28, an audio adapter 30, and a graphics adapter 32. Lan adapter 24 is used to connected computer system 10 to an external computer network 34. SCSI adapter 26 is used to control high-speed SCSI disk drive 36. Expansion bus bridge 28 is used to couple an ISA expansion bus 38 to PCI local bus 20. As shown, several user input devices are connected to ISA bus 38, including a keyboard 40, a microphone 42, and a graphical pointing device (mouse) 44. Other devices may also be attached to ISA bus 38, such as a CD-ROM drive 46. Audio adapter 30 controls audio output to a speaker 48, and graphics adapter 32 controls visual output to a display monitor 50.

Figure 2:
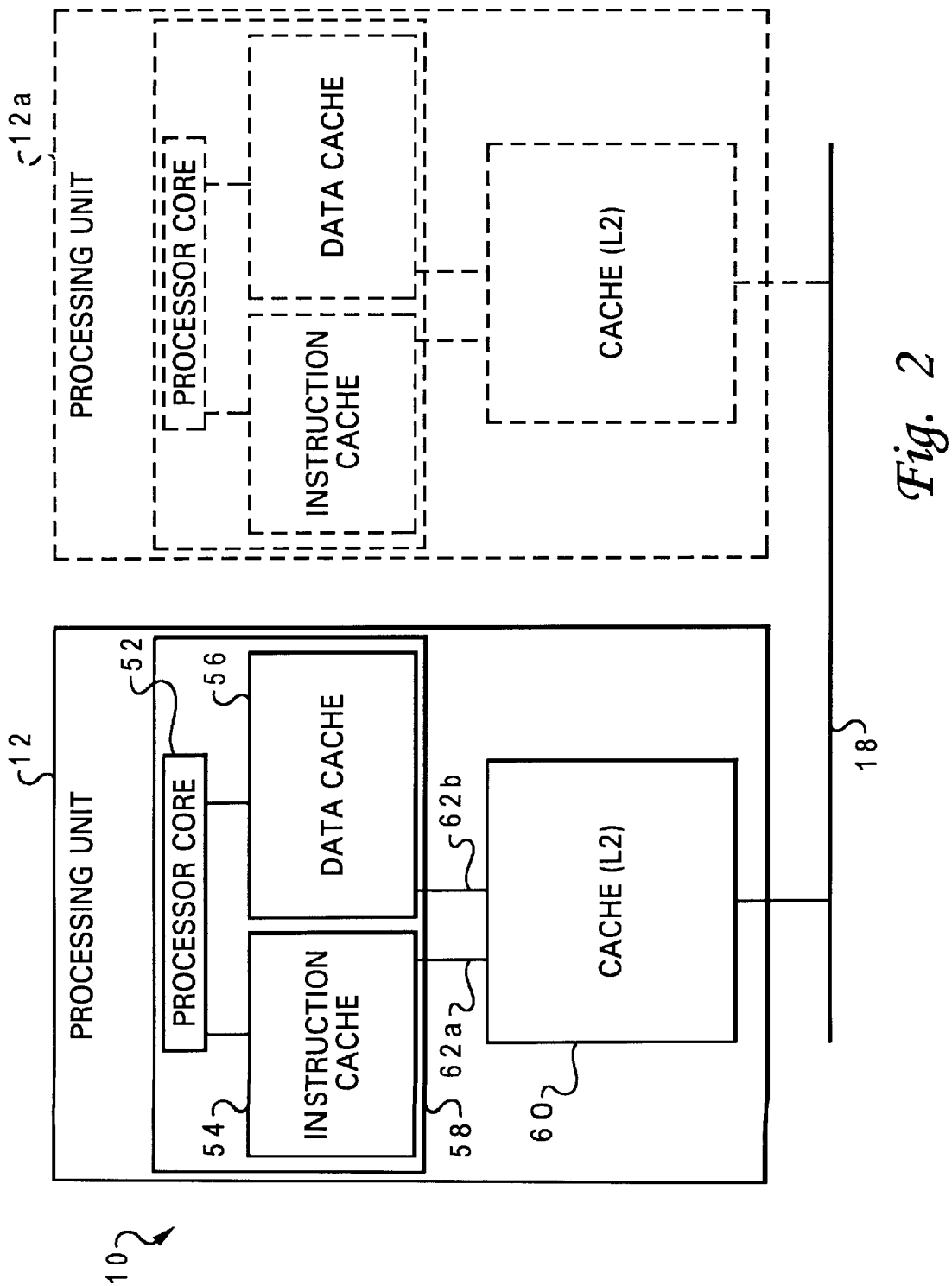
FIG. 2 is a block diagram of the processing unit used in the computer system of FIG. 1, depicting internal buses which are designed according to the present invention to exhibit relatively low power dissipation.

In addition to the external buses shown in FIG. 1, system 10 has various internal buses, such as those used by CPU 12. As seen in FIG. 2, CPU 12 includes a processor core 52, and an instruction cache 54 and a data cache 56, which are implemented using high speed memory devices, and are integrally packaged with the processor core on a single integrated chip 58. Cache 60 (L2) supports caches 54 and 56 via a processor bus which includes an instruction bus 62a and a data bus 62b. Cache 30 is connected to system bus 18. More than one processor may be provided, as indicated by processing unit 12a.

Figure 3:
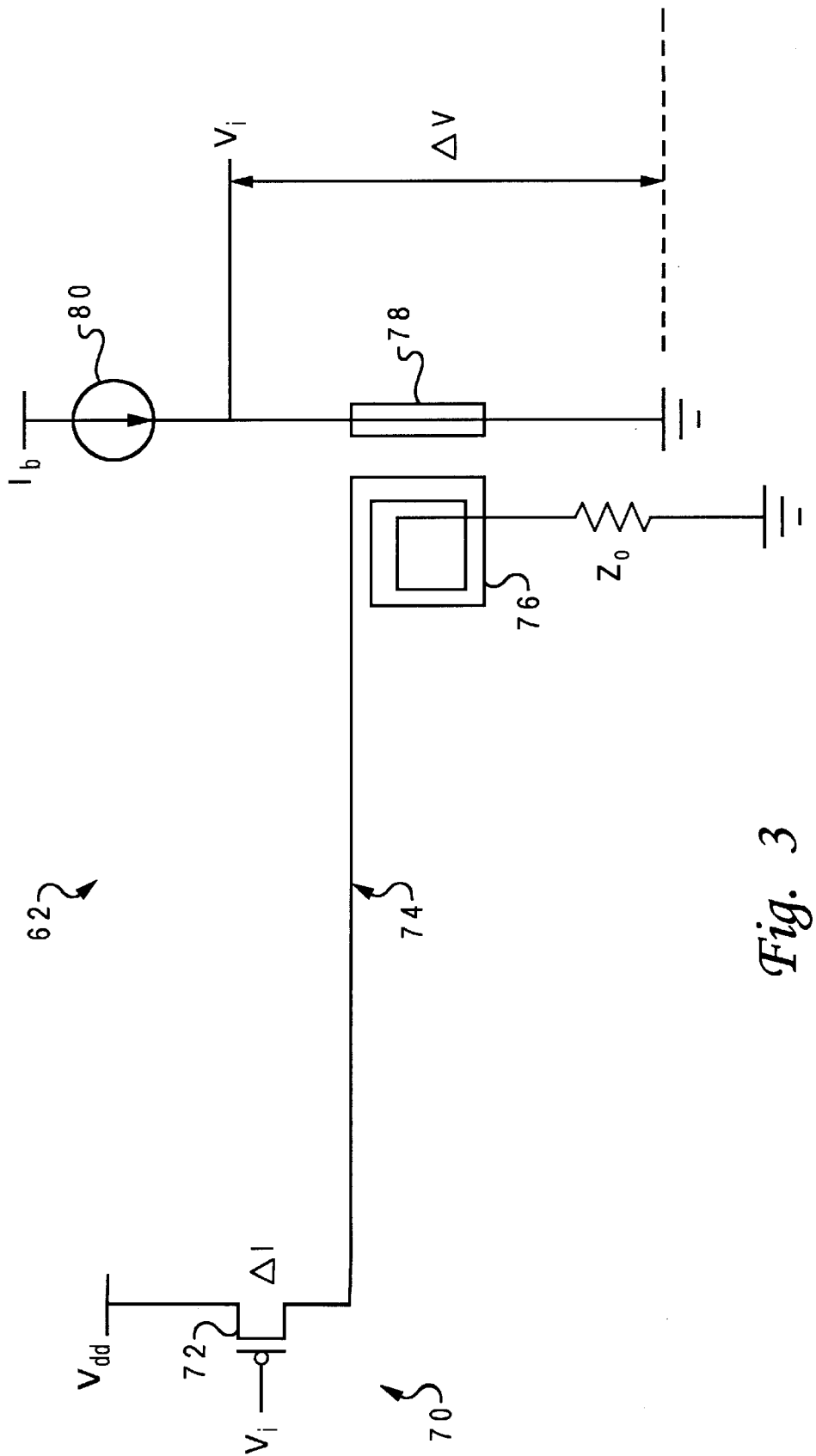
FIG. 3 is a schematic diagram of the low power communications bus used in the processing unit of FIG. 2, having magnetoresistive elements.

Computer system 10 implements the present invention by providing low power interconnections for instruction bus 62a and data bus 62b. This embodiment achieves the reduction in power requirements by using magnetoresistive elements, as illustrated in FIG. 3. The source end 70 of the bus 62 (representing either bus 62a or bus 62b) has a current source comprised of a p-type metal-oxide semiconducting (PMOS) transistor 72 whose source lead is connected to the supply voltage $V_{dd}$ and whose gate is connected to the signal input $V_i$. The drain of PMOS transistor 72 is connected to the transmission line 74. The other (load) end of transmission line 74 is connected to an induction coil 76 formed on the same substrate 58. The terminal end of induction coil 76 is connected to ground.

When $V_i$ switches from a high state to a low state at source end 70 of bus 62, a current change $\Delta I$ occurs in transmission line 74. This current change results in a magnetic field generated by coil 76, which is sensed by a magnetoresistive element 78. Magnetoresistive element 78 interconnects a current source 80 $I_b$ to ground. A tap located between current source 80 and magnetoresistive element 78 results in a voltage $\Delta V$ relative to ground, which can be used to re-generate the input signal $V_i$.

Magnetoresistive elements generally exhibit a drop in electrical resistance in the presence of an applied magnetic field. The sheet resistance of the element changes due to, among other things, the phenomenon of electron spin. The magnetoresistive elements used in the preferred embodiments may be anisotropic magnetoresistive (AMR) elements, giant magnetoresistive elements, or colossal magnetoresistive (CMR) elements. The preferred embodiment would utilize magnetoresistive phenomena with large resistance change at low saturation fields (<100 Oe) such as magnetic tunnel junctions (W. J. Gallagher, et al., Journal of Applied Physics, vol. 81, p. 3741 (1997); Y. Lu, et al., Applied Physics Letters, vol. 0, p. 2610, (1997)). A 1 mA current through a circular loop of effective radius 1 $\mu$m can generate a magnetic field of 6 Oe (corresponding to 0.6 mT) at the center of the loop. The field can be increased to order of 60 Oe (6 mT) by increasing the number of turns and/or adding magnetic materials ("concentrators") to focus the field at the center of the coil. The inductance of the loop is of the order of (6 mT×1 $\mu$m$^2$/1 mA)=6 pH/turn, or about 60 pH. The $L/Z_0$ time constant of the coil 76 is about 1 ps and much less than the rise times of CMOS signals. The currents in the circuit ($\Delta I$ and $I_b$) can thus be kept low (order of 1 mA) while generating large enough saturation magnetic fields. In the conventional interconnection circuits, the driver currents are of the order of $V_{dd}/Z_0 \sim 1.5$ V/50 $\Omega$=30 mA. The power dissipation P in the magnetoelectronic circuit depicted in FIG. 3 (P=$V_{dd}$ $\Delta I$+$I_b\Delta V$<2($V_{dd}\Delta I$))=2 mW can be 15 times lower than the conventional case. Furthermore, the power dissipation can be reduced if lower supply voltages ($V_{dd}$) are used for the I/O circuits. It must be noted that these power advantages can be realized without sacrificing the high bandwidth requirements.

Existing magnetoresistance technology can be used to provide on-board buses having a physical width of as little as 100 nm. At lower scales (nano), the use of ferromagnetic materials in the magnetoresistive elements is unnecessary as an element can be constructed using an annulus in the quantized Hall regime, which exhibits the Aharonov-Bohm effect (the magnetoresistance function has a known periodicity).

The use of magnetoresistive elements to provide a low power interconnection has other advantages. For example, it effectively eliminates ground loops and associated ground bounce. Also, the bus does not require the traditional push-pull interface (a pair of n-type and p-type CMOS devices that act as a buffer for the source signal).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

I claim:

1. A communications bus for interconnecting two or more logic components in an electronic device, the communications bus comprising:

a transmission line having a source end and a load end;

current means connected to said source end of said transmission line, for providing at least two current levels associated with two respective logic states; and means for generating said respective logic states based on current levels sensed at said load end of said transmission line, said generating means including means for inducing a magnetic field at said load end of said transmission line based on one of said current levels, and means for sensing said magnetic field.

2. The communications bus of claim 1 wherein said transmission line is fabricated on a common substrate with the logic components of the electronic device.

3. The communications bus of claim 1 wherein said current means provides a maximum current level of 100 mA.

4. The communications bus of claim 1 wherein said current means includes a CMOS device with a gate adapted to receive a signal input, a source lead connected to a power supply, and a drain lead connected to said source end of said transmission line.

5. The communications bus of claim 1 wherein:

said inducing means comprises at least one coil formed at said load end of said transmission line; and said sensing means comprises at least one magnetoresistive element located adjacent said coil.

6. The communications bus of claim 5 wherein:

said magnetoresistive element has a lead connected to a first ground plane; and said coil has a lead coupled to a second ground plane different from said first ground plane.

7. The communications bus of claim 5 wherein:

said magnetoresistive element has a first lead connected to ground; and said generating means further includes a current source connected to a second lead of said magnetoresistive element, and a tap connected to said second lead of said magnetoresistive element.

8. An electronic device comprising:

at least two logic components; and means for interconnecting said two logic components, said interconnecting means including a transmission line having a source end and a load end, means for applying a current to said source end of said transmission line based on a logic state of a first one of said logic components, and means for presenting said logic state to a second one of said logic components, based on a current level sensed at said load end of said transmission line, wherein said presenting means further includes means for inducing a magnetic field at said load end of said transmission line using said current from said applying means, and means for sensing said magnetic field.

9. The electronic device of claim 8 wherein said applying means provides a maximum current level of 100 mA.

10. The electronic device of claim 8 wherein:

said inducing means comprises at least one coil formed at said load end of said transmission line; and said sensing means comprises at least one magnetoresistive element located adjacent said coil.

11. The electronic device of claim 10 wherein:

said magnetoresistive element has a lead connected to a first ground plane; and said coil has a lead coupled to a second ground plane different from said first ground plane.

12. The electronic device of claim 10 wherein said transmission line, said applying means, said presenting means and said at least two logic components are all fabricated on a common substrate.

13. A computer system comprising:

a system memory device;

a cache memory device connected to said system memory device;

a processor; and means for interconnecting said processor and said cache memory device, said interconnecting means including a transmission line having a source end and a load end, means for applying a current to said source end of said transmission line based on a logic state of said processor, and means for presenting said logic state to said cache memory device, based on a current level sensed at said load end of said transmission line, wherein said presenting means further includes at least one induction coil connected to said load end of said transmission line, and at least one magnetoresistive element located adjacent said coil.

14. The computer system of claim 13 wherein said transmission line, said applying means, said presenting means, said processor and said cache memory device are all fabricated on a common substrate.

15. The computer system of claim 13 wherein said applying means provides a maximum current level of 20 mA.

16. The computer system of claim 13 wherein:

said magnetoresistive element has a lead connected to a first ground plane; and said coil has a lead coupled to a second ground plane different from said first ground plane.

* * * * *

UNITED STATES PATENT AND TRADEMARK OFFICE
CERTIFICATE OF CORRECTION

PATENT NO. : 5,939,869
DATED : August 17, 1999
INVENTOR(S) : Ghoshal

It is certified that error appears in the above-identified patent and that said Letters Patent is hereby corrected as shown below:

Column 4, Line 36 delete "0" and replace with --70--.

Signed and Sealed this

Thirteenth Day of June, 2000

*Attest:*

*Attesting Officer*

Q. TODD DICKINSON
*Director of Patents and Trademarks*